(12) United States Patent
Haruta et al.

(10) Patent No.: US 6,736,890 B2
(45) Date of Patent: May 18, 2004

(54) COATING MATERIAL FOR FORMING TITANIUM OXIDE FILM, METHOD FOR FORMING TITANIUM OXIDE FILM AND USE OF SAID COATING MATERIAL

(75) Inventors: Yasuhiko Haruta, Hiratsuka (JP); Jun Akui, Hiratsuka (JP); Osamu Isozaki, Yokohama (JP)

(73) Assignee: Kansai Paint Co., Ltd., Amagasaki (JP)

( * ) Notice: Subject to any disclaimer, the term of this patent is extended or adjusted under 35 U.S.C. 154(b) by 0 days.

(21) Appl. No.: 10/312,571

(22) PCT Filed: Jul. 23, 2001

(86) PCT No.: PCT/JP01/06320
§ 371 (c)(1),
(2), (4) Date: Jan. 14, 2003

(87) PCT Pub. No.: WO02/08490
PCT Pub. Date: Jan. 31, 2002

(65) Prior Publication Data
US 2003/0152704 A1 Aug. 14, 2003

(30) Foreign Application Priority Data

| Jul. 25, 2000 | (JP) | 2000-224533 |
| Aug. 9, 2000 | (JP) | 2000-240610 |
| Aug. 9, 2000 | (JP) | 2000-240611 |
| May 22, 2001 | (JP) | 2001-152444 |

(51) Int. Cl.$^7$ .......................................... C01G 23/053
(52) U.S. Cl. ................. 106/287.19; 106/287.1
(58) Field of Search .......................... 106/287.1, 287.19

(56) References Cited

U.S. PATENT DOCUMENTS 5,091,009 A * 2/1992 Nogami et al. .......... 106/287.1

FOREIGN PATENT DOCUMENTS

| JP | 53-5039 | 1/1978 |
| JP | 54-24232 | 2/1979 |
| JP | 10-67516 | 3/1998 |

* cited by examiner

Primary Examiner—David Brunsman
(74) Attorney, Agent, or Firm—Armstrong, Kratz, Quintos, Hanson & Brooks, LLP

(57) ABSTRACT

The present invention provides: a coating composition for forming a titanium oxide film, comprising (A) a titanium-containing aqueous liquid obtained by mixing at least one titanium compound selected from the group consisting of hydrolyzable titanium compounds, low condensates of hydrolyzable titanium compounds, titanium hydroxide and low condensates of titanium hydroxide with aqueous hydrogen peroxide, and (B) at least one halide selected from the group consisting of titanium halides, titanium halide salts, zirconium halides, zirconium halide salts, silicon halides and silicon halide salts; a process for forming a titanium oxide film, comprising applying the coating composition to a metal substrate and drying the resulting coat; and an undercoating material for metal substrates and a post-treating agent for phosphate undercoats on metal substrates, the material and agent being the above coating composition.

25 Claims, No Drawings

COATING MATERIAL FOR FORMING TITANIUM OXIDE FILM, METHOD FOR FORMING TITANIUM OXIDE FILM AND USE OF SAID COATING MATERIAL

This is a 371 of PCT/JP01/06320 filed Jul. 23, 2001.

TECHNICAL FIELD

The present invention relates to a novel coating composition for forming a titanium oxide film, process for forming a titanium oxide film, and use of the coating composition.

BACKGROUND ART

Metal substrates such as steel sheets, aluminum and aluminum alloys are usually subjected to various types of surface treatment (undercoating) to improve the corrosion resistance, coating adhesion, processability, etc.

In recent years, surface-treated steel sheets are required to have higher corrosion resistance, and therefore zinc-based metal plated steel sheets are frequently used as metal substrates replacing cold rolled steel sheets.

Conventionally, chromate treatment or phosphate treatment is employed for surface treatment of zinc-based metal plated steel sheets.

Chromate treatment have problems with inherent toxicity of chromium compounds. In particular, hexavalent chromium compounds are extremely harmful substances designated human carcinogens by IARC (International Agency for Research on Cancer Review) and many other public organizations. Specifically stated, chromate treatment has problems with chromate fumes produced during the treatment process, extremely high cost required for waste water disposal equipment, chromic acid dissolved out from chromate treatment coats, and the like.

Phosphate treatment using zinc phosphate, iron phosphate or like phosphate is usually followed by chromate post-treatment, and thus involves the problems with toxicity of chromium compounds. Moreover, phosphate treatment has problems with disposal of waster water which contains reaction accelerators, metal ions and the like owing to phosphate treatment agents, and sludge disposal necessitated by metal ions dissolved out from treated metals.

As another post-treating agent for phosphate treatment coats than chromate, Japanese Examined Patent Publication No. 1995-42423 proposes a post-treating composition containing metal ions such as titanium ions or zirconium ions and polyalkenyl phenol. However, when the proposed post-treating composition is used for post-treatment of a phosphate treatment coat on a zinc-based metal plated steel sheet, the composition does not sufficiently inhibit white rusting and thus hardly improves the corrosion resistance.

Japanese Unexamined Patent Publications No. 1983-224174, No. 1985-50179 and No. 1985-50180 disclose coated steel sheets comprising a zinc-based metal plated steel sheet substrate, a chromate coat formed on the substrate and an organic silicate coat formed on the chromate coat. The disclosed coated steel sheets are excellent in corrosion resistance and processability, but have the problems with toxicity of chromium compounds owing to the chromate coat. Without the chromate coat, the coated steel sheets have insufficient corrosion resistance.

Aluminum or aluminum alloy substrates are also subjected to various types of surface treatment (undercoating) in many cases, to improve the corrosion resistance, coating adhesion and other properties.

Generally, fins in heat exchangers for air conditioners are made of aluminum or aluminum alloy substrates which are light in weight and excellent in processability and thermal conductivity. In air conditioner heat exchangers, water condenses into droplets and forms water bridges between the fins during cooling operation. The bridges narrow the passageway for air and increase the resistance to air passage, thus causing problems such as power loss, noise, water splashing, etc.

To solve these problems, surfaces of the aluminum or aluminum alloy fins are subjected to boehmite treatment, water glass coating, aqueous polymer coating or like hydrophilizing treatment for preventing bridge formation. However, in a highly corrosive environment, the hydrophilized aluminum or aluminum alloy fins are corroded within a few months or so, partly because of the hydrophilicity of the treatment coat.

To prevent corrosion of the fins, chromate treatment is often employed for undercoating of aluminum or aluminum alloy substrates, since chromate treatment has the advantages of providing good corrosion resistance with low cost. However, chromate treatment is accompanied by the problems with toxicity of chromium compounds as described above.

As chromate-free undercoating materials and undercoating processes, Japanese Unexamined Patent Publication No. 1979-24232 discloses treatment of an aluminum surface with an acid solution comprising a titanium salt, hydrogen peroxide and condensed phosphoric acid; Japanese Unexamined Patent Publication No. 1979-160527 discloses treatment of an aluminum surface with an aqueous alkaline solution containing titanium ions and a complexing agent, followed by water washing and treatment with an aqueous solution of an acid such as phosphoric acid; Japanese Unexamined Patent Publication No. 1997-20984 discloses an aluminum surface treating agent comprising phosphoric acid ions, a titanium compound and a fluoride; and Japanese Unexamined Patent Publication No. 1997-143752 discloses an aluminum-based metal surface treating agent comprising condensed phosphate, a titanium salt, a fluoride and phosphite.

However, these undercoating materials and processes utilizing titanium compounds have the problems such as insufficient stability of the undercoating materials, lower corrosion resistance of the coat than a chromate treatment coat, insufficient hydrophilicity and insufficient durability of the coat.

In view of the above state of the art, there are demands for an inorganic film-forming material which is useful as an undercoating material for metal substrates such as steel sheets, aluminum, aluminum alloys or the like, or as a post-treating agent for phosphate undercoats, and which is capable of forming a film excellent in corrosion resistance and other properties without causing toxicity problems.

DISCLOSURE OF THE INVENTION

An object of the present invention is to provide a novel coating composition and process for forming a titanium oxide film, which are capable of forming, on a metal substrate, an undercoat excellent in corrosion resistance, processability and coating adhesion.

Another object of the invention is to provide an undercoating material for a metal substrate, which is capable of forming a film excellent in corrosion resistance, processability and coating adhesion.

A further object of the invention is to provide a post-treating agent for phosphate undercoats on metal substrates, which is capable of forming a film excellent in corrosion resistance, processability and coating adhesion.

Other objects and features of the present invention will become apparent from the following description.

The invention provides the following novel coating compositions for forming a titanium oxide film, processes for forming a titanium oxide film, and use of the coating compositions:

1. A coating composition for forming a titanium oxide film, comprising (A) a titanium-containing aqueous liquid obtained by mixing at least one titanium compound selected from the group consisting of hydrolyzable titanium compounds, low condensates of hydrolyzable titanium compounds, titanium hydroxide and low condensates of titanium hydroxide with aqueous hydrogen peroxide, and (B) at least one halide selected from the group consisting of titanium halides, titanium halide salts, zirconium halides, zirconium halide salts, silicon halides and silicon halide salts.

2. A coating composition according to item 1, wherein the titanium-containing aqueous liquid (A) is an aqueous peroxo titanic acid solution obtained by mixing a hydrolyzable titanium compound and/or its low condensate with aqueous hydrogen peroxide.

3. A coating composition according to item 2, wherein the hydrolyzable titanium compound is a tetraalkoxytitanium represented by the formula

$$\text{Ti(OR)}_4 \tag{1}$$

wherein Rs may be the same or different and each represent $C_1$ to $C_5$ alkyl.

4. A coating composition according to item 2, wherein the low condensate of a hydrolyzable titanium compound is a compound having a condensation degree of 2 to 30 and obtained by self-condensation of tetraalkoxytitanium(s) represented by the formula

$$\text{Ti(OR)}_4 \tag{1}$$

wherein Rs may be the same or different and each represent $C_1$ to $C_5$ alkyl.

5. A coating composition according to item 2, wherein the proportion of the aqueous hydrogen peroxide is 0.1 to 100 parts by weight calculated as hydrogen peroxide, per 10 parts by weight of the hydrolyzable titanium compound and/or its low condensate.

6. A coating composition according to item 2, wherein the titanium-containing aqueous liquid (A) is an aqueous peroxo titanic acid solution obtained by mixing a hydrolyzable titanium compound and/or its low condensate with aqueous hydrogen peroxide in the presence of a titanium oxide sol.

7. A coating composition according to item 6, wherein the titanium oxide sol is an aqueous dispersion of anatase titanium oxide.

8. A coating composition according to item 6, wherein the proportion of the titanium oxide sol is 0.01 to 10 parts by weight as solids, per 1 part by weight of the hydrolyzable titanium compound and/or its low condensate.

9. A coating composition according to item 1, wherein the halide (B) is at least one member selected from the group consisting of titanium hydrofluoric acid, titanium potassium fluoride, titanium ammonium fluoride, zirconium hydrofluoric acid, zirconium ammonium fluoride, zirconium potassium fluoride, hydrosilicofluoric acid, sodium silicofluoride, ammonium silicofluoride and potassium silicofluoride.

10. A coating composition according to item 1, wherein the proportion of the halide (B) is 10 to 300 parts by weight per 100 parts by weight of the solids in the titanium-containing aqueous liquid (A).

11. A coating composition according to item 1, which has a pH of 2 to 10.

12. A process for forming a titanium oxide film, comprising applying a coating composition according to item 1 to a metal substrate and drying the resulting coat.

13. An undercoating material for a metal substrate, which is a coating composition according to item 1.

14. An undercoating material according to item 13, wherein the metal substrate is a steel sheet.

15. A coated steel sheet comprising a film of an undercoating material according to item 14 formed on a steel sheet surface.

16. A coated steel sheet according to item 15, wherein the film is 0.05 to 10 $\mu$m thick.

17. A post-treating agent for phosphate undercoats on metal substrates, which is a coating composition according to item 1.

18. A post-treating agent according to item 17, wherein the metal substrate is a steel sheet.

19. A coated substrate comprising a film of a post-treating agent according to item 17 formed on a surface of a phosphate undercoat on a metal substrate.

20. A coated substrate according to item 19, wherein the weight of the film of the post-treating agent is 0.05 to 3.0 g/m².

21. An undercoating material according to item 13, wherein the metal substrate is made of aluminum or aluminum alloy.

22. A coated substrate comprising a film of an undercoating material according to item 21 formed on a surface of an aluminum substrate or an aluminum alloy substrate.

23. A coated substrate according to item 22, wherein the film is 0.001 to 10 $\mu$m thick.

24. A heat exchanger fin comprising an aluminum substrate or an aluminum alloy substrate, a film of an undercoating material according to item 21 formed on the substrate, and a hydrophilizing coat formed on the film.

25. A fin according to item 24, wherein the film of the undercoating material is 0.001 to 10 $\mu$m thick, and the hydrophilizing coat is 0.3 to 5 $\mu$m thick.

The present inventors carried out extensive research to achieve the above objects, and found that the above specified coating compositions are capable of forming, on a metal substrate, a film excellent in corrosion resistance, processability and coating adhesion and thus suitable as an undercoat. They further found that the coating compositions are suitable as post-treating agents for phosphate undercoats on metal substrates.

The present invention has been accomplished based on these novel findings.

Coating Composition for Forming a Titanium Oxide Film

The coating composition for forming a titanium oxide film according to the present invention is an aqueous coating composition comprising (A) a titanium-containing aqueous liquid and (B) a halide, as described above.

The aqueous liquid component (A) for use in the composition of the invention can be suitably selected from known titanium-containing aqueous liquids obtainable by mixing at least one titanium compound selected from the group consisting of hydrolyzable titanium compounds, low condensates of hydrolyzable titanium compounds, titanium hydroxide and low condensates of titanium hydroxide, with aqueous hydrogen peroxide.

The hydrolyzable titanium compounds are titanium compounds each containing a hydrolyzable group or groups bonded directly to a titanium atom. The compounds produce titanium hydroxide when reacted with water, water vapor or the like. In the hydrolyzable titanium compounds, the groups bonded to the titanium atom may be all hydrolyzable groups, or part of the groups may be previously hydrolyzed to hydroxyl groups.

The hydrolyzable groups may be any groups capable of producing hydroxyl groups by reaction with water. Examples of such groups include lower alkoxyl and groups forming salts with titanium atoms. Examples of the groups forming salts with titanium atoms include halogen atoms (e.g., chlorine atoms), hydrogen atoms and sulfuric acid ions.

Examples of hydrolyzable titanium compounds containing lower alkoxyl groups as hydrolyzable groups include tetraalkoxytitaniums.

Typical examples of hydrolyzable titanium compounds containing, as hydrolyzable groups, groups forming salts with titanium include titanium chloride and titanium sulfate.

The low condensates of hydrolyzable titanium compounds are products of low self-condensation of the hydrolyzable titanium compounds. In the low condensates, the groups bonded to the titanium atom may be all hydrolyzable groups, or part of the groups may be previously hydrolyzed to hydroxyl groups.

Examples of low condensates of titanium hydroxide include orthotitanic acid (titanium hydroxide gel) obtained by reaction of an aqueous solution of titanium chloride, titanium sulfate or the like with an aqueous solution of an alkali such as ammonia or caustic soda.

The low condensates of hydrolyzable titanium compounds or low condensates of titanium hydroxide have a condensation degree of 2 to 30, preferably 2 to 10.

The aqueous liquid (A) may be a known titanium-containing aqueous liquid obtained by reaction of the above titanium compound with aqueous hydrogen peroxide. Specific examples of such aqueous liquids include the following:

(1) Aqueous peroxo titanic acid solutions described in Japanese Unexamined Patent Publications No. 1988-35419 and No. 1989-224220, obtained by adding aqueous hydrogen peroxide to a gel or sol of hydrous titanium oxide;

(2) Yellow, transparent, viscous aqueous liquids for forming titanium oxide films, described in Japanese Unexamined Patent Publications No. 1997-71418 and No. 1998-67516, obtained by: reacting an aqueous solution of titanium chloride, titanium sulfate or the like with an aqueous solution of an alkali such as ammonia or caustic soda to precipitate a titanium hydroxide gel called orthotitanic acid; isolating the titanium hydroxide gel by decantation; washing the isolated gel; and adding aqueous hydrogen peroxide to the gel;

(3) Titanium oxide film-forming aqueous liquids described in Japanese Unexamined Patent Publications No. 2000-247638 and 2000-247639, obtained by: adding aqueous hydrogen peroxide to an aqueous solution of an inorganic titanium compound such as titanium chloride or titanium sulfate to prepare a peroxo titanium hydrate; adding a basic substance to the peroxo titanium hydrate; allowing to stand or heating the resulting solution to precipitate a peroxo titanium hydrate polymer; removing dissolved components other than water; and allowing hydrogen peroxide to act.

Preferably, the titanium-containing aqueous liquid (A) is an aqueous peroxo titanic acid solution (A1) obtained by mixing a hydrolyzable titanium compound and/or its low condensate with aqueous hydrogen peroxide.

A particularly preferred example of the titanium compounds is a tetraalkoxytitanium represented by the formula $$Ti(OR)_4 \tag{1}$$

wherein Rs may be the same or different and each represent $C_1$ to $C_5$ alkyl. Examples of $C_1$ to $C_5$ alkyl represented by R include methyl, ethyl, n-propyl, isopropyl, n-butyl, isobutyl, sec-butyl and tert-butyl.

The low condensates of titanium compounds are preferably self-condensates of the compounds of the formula (1) having a condensation degree of 2 to 30, preferably 2 to 10.

The proportion of the aqueous hydrogen peroxide is preferably 0.1 to 100 parts by weight, particularly 1 to 20 parts by weight, calculated as hydrogen peroxide, per 10 parts of the hydrolyzable titanium compound of the formula (1) and/or its low condensate (hereinafter the compound and/or its low condensate is referred to simply as "hydrolyzable titanium compound (I)"). Less than 0.1 part by weight of aqueous hydrogen peroxide (calculated as hydrogen peroxide) will result in insufficient formation of peroxo titanic acid, producing opaque precipitates. On the other hand, if more than 100 parts by weight (calculated as hydrogen peroxide) of aqueous hydrogen peroxide is used, it is likely that part of hydrogen peroxide remains unreacted and emits hazardous active oxygen during storage.

The hydrogen peroxide concentration in the aqueous hydrogen peroxide is not limited, but is preferably 3 to 40 wt. %, considering ease of handling.

The aqueous peroxo titanic acid solution can be prepared usually by mixing the hydrolyzable titanium compound (I) with aqueous hydrogen peroxide with stirring at about 1 to 70° C. for about 10 minutes to 20 hours. If necessary, methanol, ethanol, n-propanol, isopropanol, ethylene glycol monobutyl ether, propylene glycol monomethyl ether or like water-soluble solvent may be also mixed.

Presumably, the aqueous peroxo titanic acid solution (A1) is obtained through the following mechanism: When the hydrolyzable titanium compound (I) is mixed with aqueous hydrogen peroxide, the compound is hydrolyzed with water and formed into a hydroxyl-containing titanium compound. Immediately thereafter, hydrogen peroxide is coordinated to the hydroxyl-containing titanium compound to thereby form peroxo titanic acid. The aqueous peroxo titanic acid solution is highly stable at room temperature and durable for long-term storage.

Also preferred is an aqueous peroxo titanic acid solution (A2) obtained by mixing the hydrolyzable titanium compound (I) with aqueous hydrogen peroxide in the presence of a titanium oxide sol, since this solution has improved storage stability and is capable of forming a titanium oxide film improved in corrosion resistance and other properties. The reason for the improvements is presumed as follows: During preparation of the aqueous solution, the hydrolyzable titanium compound (I) is adsorbed on the titanium oxide sol particles and chemically bonded by condensation to hydroxyl groups generated on the particle surface. Further, the hydrolyzable titanium compound undergoes self-condensation and is converted into a high molecular compound. The high molecular compound is mixed with aqueous hydrogen peroxide, thereby giving a stable aqueous peroxo titanic acid solution remarkably free of gelation and thickening during storage.

The titanium oxide sol comprises amorphous titanium oxide particles or anatase titanium oxide particles dispersed in water. As the titanium oxide sol, an aqueous dispersion of anatase titanium oxide is preferred from the viewpoint of corrosion resistance. The titanium oxide sol may contain, in addition to water, an aqueous organic solvent such as an alcohol solvent or an alcohol ether solvent.

The titanium oxide sol may be known one, such as a dispersion of amorphous titanium oxide particles obtained by dispersing titanium oxide agglomerates in water, or a dispersion in water of anatase titanium oxide particles obtained by calcining titanium oxide agglomerates. Amorphous titanium oxide can be converted into anatase titanium oxide by calcination at a temperature not lower than the anatase crystallization temperature, usually at a temperature not lower than 200° C. Examples of titanium oxide agglomerates include (1) agglomerates obtained by hydrolysis of an inorganic titanium compound such as titanium sulfate or titanyl sulfate, (2) agglomerates obtained by hydrolysis of an organic titanium compound such as titanium alkoxide, (3) agglomerates obtained by hydrolysis or neutralization of a solution of titanium halide such as titanium tetrachloride.

Commercially available titanium oxide sols include, for example, "TKS-201" (tradename, an aqueous sol of anatase titanium oxide particles with an average particle size 6 nm manufactured by TEICA Corp.), "TKS-203" (tradename, an aqueous sol of anatase titanium oxide particles with an average particle size of 6 nm manufactured by TEICA Corp.), "TA-15" (tradename, an aqueous sol of anatase titanium oxide particles manufactured by Nissan Chemical Industries, Ltd.) and "STS-11" (tradename, an aqueous sol of anatase titanium oxide particles manufactured by Ishihara Sangyo Kaisha, Ltd.).

The amount of the titanium oxide sol used when mixing the hydrolyzable titanium compound (I) and aqueous hydrogen peroxide is, as solids, usually 0.01 to 10 parts by weight, preferably 0.1 to 8 parts by weight, per 1 part by weight of the hydrolyzable titanium compound (I). Less than 0.01 part by weight of the titanium oxide sol fails to achieve the effect of adding a titanium oxide sol, i.e., improvement of storage stability of the coating composition and corrosion resistance of the titanium oxide film. On the other hand, more than 10 parts by weight of the sol impairs the film-forming properties of the coating composition.

The titanium-containing aqueous liquid (A) may be used in the form of a dispersion of titanium oxide particles with an average particle size not greater than 10 nm. Such a dispersion can be prepared by mixing the hydrolyzable titanium compound (I) with aqueous hydrogen peroxide optionally in the presence of the titanium oxide sol, and then subjecting the resulting aqueous peroxo titanic acid solution to heat treatment or autoclave treatment at a temperature not lower than 80° C. The dispersion usually has a translucent appearance.

If the heat treatment or autoclave treatment is carried out at a temperature lower than 80° C., the crystallization of titanium oxide does not proceed sufficiently. The titanium oxide particles obtained by heat treatment or autoclave treatment have a particle size not greater than 10 nm, preferably a particle size of 1 nm to 6 nm. If the titanium oxide particles have a particle size greater than 10 nm, the resulting coat composition has such a low film-forming properties that a film with a thickness of 1 $\mu$m or greater develops cracks.

When the aqueous solution (A1) is used as the titanium-containing aqueous liquid (A), the solution usually forms an amorphous titanium oxide film containing a slight amount of hydroxyl groups under the above drying conditions. The amorphous titanium oxide film has the advantage of higher gas barrier properties. When the titanium-containing aqueous solution (A2) is used as the aqueous solution (A), the solution usually forms an anatase titanium oxide film containing a slight amount of hydroxyl groups under the above drying conditions.

The component (B) of the composition of the invention is at least one halide selected from the group consisting of titanium halides, titanium halide salts, zirconium halides, zirconium halide salts, silicon halides and silicon halide salts.

Examples of halogens in the component (B) include fluorine, chlorine and iodine. Among them, fluorine is particularly preferred to achieve excellent storage stability, corrosion resistance, moisture resistance, etc.

The halide salts for use as the component (B) are, for example, salts formed with sodium, potassium, lithium, ammonium or the like. Among them, potassium and sodium are preferred.

Preferred examples of the halide (B) include titanium hydrofluoric acid or like titanium halides; titanium potassium fluoride, titanium ammonium fluoride and like titanium halide salts; zirconium hydrofluoric acid and like zirconium halides; zirconium ammonium fluoride, zirconium potassium fluoride and like zirconium halide salts; hydrosilicofluoric acid and like silicon halides; and sodium silicofluoride, ammonium silicofluoride, potassium silicofluoride and like silicon halide salts.

The proportion of the halide (B) in the coating composition of the invention is 10 to 300 parts by weight, preferably 20 to 150 parts by weight, per 100 parts by weight of the solids in the titanium-containing aqueous liquid (A).

The coating composition of the invention is aqueous and usually has a pH of 2 to 10. Preferably, the coating composition has good storage stability in the acidic region, and has a pH of 2 to 6, in particular 3 to 5.

The coating composition of the invention may optionally contain additives, such as rust preventive agents, titanium oxide sols, titanium oxide powders, extender pigments, rust preventive pigments, coloring pigments and surfactants. Examples of rust preventive agents include tannic acid, phytic acid and benzotriazole. Examples of extender pigments include mica, talc, silica, barium sulfate and clay.

Preferably, the composition of the invention is free from phosphoric acid compounds such as phosphoric acid, polyphosphoric acid, phosphoric acid derivatives, phosphorous acid and hypophosphorous acid, since these compounds reduce the storage stability of the composition for some unknown reason.

The coating composition of the invention has excellent storage stability, and is capable of forming, on a metal substrate, a titanium oxide-containing film excellent in corrosion resistance, processability and coating adhesion. Accordingly, the composition is suitable as an undercoating material for metal substrates and as a post-treating agent for phosphate undercoats.

Process for Forming a Titanium Oxide Film

The process for forming a titanium oxide film according to the invention comprises applying the coating composition of the invention to a metal substrate and drying the resulting coat.

The metal substrate for use in the process of the invention may be any substrate at least having a metal surface. Examples of usable substrates include those having a surface made of iron, aluminum, zinc, copper, tin or an alloy containing any of these metals. Typical examples of such substrates include iron sheets, cold rolled steel sheets, zinc-based metal plated steel sheets, aluminum sheets, aluminum alloy sheets and aluminum plated steel sheets. Examples of zinc-based metal plated steel sheets include hot-dip galvanized steel sheets, electrogalvanized steel sheets, iron-zinc alloy plated steel sheets, nickel-zinc alloy plated steel sheets, and aluminum-zinc alloy plated steel sheets.

The coating composition of the invention can be applied to a metal substrate by any known process, such as dip coating, shower coating, spray coating, roll coating and electrocoating. It is usually preferable that the composition is dried for about 2 seconds to 30 minutes by heating under such conditions that the substrate reaches a maximum temperature of about 60 to 250° C.

The dry film of the coating composition is preferably about 0.001 to 10 μm thick.

In this manner, the process of the invention produces, on a metal substrate, a titanium oxide film excellent in corrosion resistance, processability and coating adhesion.

Undercoating Material for Steel Sheets as Metal Substrates

The coating composition of the invention, when used as a undercoating material, is particularly preferred as an undercoating material for steel sheets.

Examples of steel sheet substrates to be coated with the undercoating material of the invention include hot-dip galvanized steel sheets, electrogalvanized steel sheets, iron-zinc alloy plated steel sheets, nickel-zinc alloy plated steel sheets, and aluminum-zinc alloy plated steel sheets. Examples of aluminum-zinc alloy plated steel sheets include those marketed under the tradenames of "Galvalium" and "Galfan". Also usable are zinc-based metal plated steel sheets that have been subjected to chemical conversion treatment such as chromate treatment, zinc phosphorate treatment or composite oxide film treatment. Further, a steel sheet assembly can be employed as a steel sheet substrate.

The coated steel sheet according to the invention comprises a film of the undercoating material of the invention formed on a steel sheet surface. The coated steel sheet can be obtained by applying the undercoating material of the invention to a steel sheet surface and drying the resulting coat.

The undercoating material can be applied to a steel sheet substrate by a known coating process such as dip coating, shower coating, spray coating, roll coating or electrocoating. The undercoating material is preferably dried for about 2 seconds to 30 minutes under such conditions that the substrate reaches a maximum temperature of about 60 to 250° C.

The dry film of the undercoating material is preferably 0.05 to 10 μm thick, in particular 0.1 to 3 μm thick. A film of the undercoating material with a thickness less than 0.05 μm is inferior in corrosion resistance, water resistance and other properties. On the other hand, a film of the undercoating material with a thickness greater than 10 μm develops cracks or has reduced processability.

The coated steel sheet of the invention is excellent in corrosion resistance, coating adhesion, processability, fingerprint resistance and other properties, and thus can be used as a rust resistant steel sheet or a lubricated rust resistant steel sheet, without further treatment.

On the coated steel sheet of the invention, an upper coat may be formed as required. The composition for forming the upper coat can be selected from various coating compositions, according to the intended purpose. Examples of coating compositions for forming the upper coat include primer compositions and colored topcoat compositions. It is also possible to apply a primer composition and then further apply a colored topcoat composition on the primer coat.

Post-Treating Agent for Phosphate Undercoats on Metal Substrates

The coating composition of the invention is suitable as a post-treating agent for phosphate undercoats on metal substrates.

The phosphate undercoat to be treated with the post-treating agent of the invention may be formed on any substrate at least having a metal surface. The substrate may be, for example, one having a surface made of iron, aluminum, zinc, copper, tin or an alloy containing any of these metals. Typical examples of such substrates include iron sheets, cold rolled steel sheets, zinc-based metal plated steel sheets, aluminum sheets, aluminum alloy sheets, and aluminum-plated steel sheets. Examples of zinc-based metal plated steel sheets include hot-dip galvanized steel sheets, electrogalvanized steel sheets, iron-zinc alloy plated steel sheets, nickel-zinc alloy plated steel sheets, and aluminum-zinc alloy plated steel sheets.

The phosphate undercoat is formed on the surface of these metal substrates by known phosphate treatment (e.g., iron phosphate treatment or zinc phosphate treatment) carried out by dip coating, roll coating or like process. The weight of the phosphate undercoat on the metal surface is not limited, but is preferably 0.05 to 5 g/m$^2$, in particular 1 to 3 g/m$^2$, from the viewpoints of processability, coating adhesion and the like.

The post-treating agent of the invention is applied to the surface of a phosphate undercoat formed on a metal surface, and dried to form a post-treatment coat.

When applying the post-treating agent of the invention to the surface of the phosphate undercoat on a metal substrate surface, the post-treating agent is usually adjusted to a viscosity of about 5 to 100 mPa·s with water according to the amount to be applied, and then applied by a process such as roll coating, spray coating, brush coating, flow coating or dip coating. After application, the excess agent may be removed by squeezing. The amount of the post-treating agent to be applied is, as dry film weight, preferably 0.05 to 3.0 g/m$^2$, in particular 0.1 to 2 g/m$^2$, from the viewpoints of corrosion resistance, processability, coating adhesion and the like. The drying conditions are not limited as long as the applied post-treating agent is sufficiently dried. For continuously drying the post-treating agent applied to a phosphate undercoat formed on a metal sheet substrate, the agent is preferably dried in an atmosphere at 100 to 250° C. for about 10 to 100 seconds (the maximum temperature reached by the substrate is preferably about 80 to 150° C.).

The substrate with the phosphate undercoat which has been post-treated with the post-treating agent of the invention is excellent in corrosion resistance, processability, coating adhesion and like properties, and thus can be used as a rust resistant steel sheet without further treatment.

Optionally, an upper coat may be formed on the post-treated phosphate undercoat. The composition for forming the upper coat can be selected from various coating compositions according to the intended purpose. Examples of coating compositions for forming the upper coat include lubricant film-forming compositions, highly corrosion resistant film-forming compositions, primer compositions and colored topcoat compositions. It is also possible to apply and dry a lubricant film-forming composition, a highly corrosion resistant film-forming composition or a primer composition, and then further apply a colored topcoat composition on the resulting coat.

Undercoating Material for Aluminum or Aluminum Alloy as Metal Substrate

The coating composition of the invention, when used as an undercoating material, is preferable as an undercoating material for aluminum or aluminum alloy substrates.

The undercoating material of the invention is applied to a surface of an aluminum or aluminum alloy substrate and dried to obtain a coated substrate.

The aluminum or aluminum alloy substrate to be coated with the undercoating material of the invention is not limited, but is typically a heat exchanger fin. The heat exchanger fin to be used as the substrate may be known one, which may be a separate member before assembly into a heat exchanger, or a member assembled into a heat exchanger.

The undercoating material can be applied to a surface of an aluminum or aluminum alloy substrate (e.g., a heat exchanger fin), by a known process such as dip coating, shower coating, spray coating, roll coating or electrocoating. The undercoating material is preferably dried for about 2 seconds to 30 minutes under such conditions that the substrate reaches a maximum temperature of about 60 to 250° C.

Preferably, the dry film of the undercoating material is usually 0.001 to 10 $\mu$m thick, in particular 0.1 to 3 $\mu$m thick. A dry film of the undercoating material with a thickness less than 0.001 $\mu$m is inferior in corrosion resistance, water resistance and like properties, whereas a dry film of the undercoating material with a thickness greater than 10 $\mu$m develops cracks and is reduced in hydrophilicity, processability and the like.

The aluminum or aluminum alloy substrate coated with the undercoating material of the invention can be used as a rust resistant coated substrate without further treatment, since the coat formed on the substrate is excellent in corrosion resistance, hydrophilicity, coating adhesion, processability and like properties. The coated substrate may be irradiated with light to further improve the hydrophilicity.

When the aluminum or aluminum alloy substrate coated with the undercoating material is used as a heat exchanger fin, it is preferable that a hydrophilizing coat is further formed on the coat of the undercoating material.

The hydrophilizing coat has a hydrophilic surface, sufficient strength, high water resistance and good adhesion to undercoats. The hydrophilizing coat can be preferably formed by applying and drying a hydrophilizing composition.

The hydrophilizing composition preferably contains a hydrophilic film-forming binder. Preferred hydrophilic film-forming binders include, for example, (1) an organic resin binder mainly comprising a hydrophilic organic resin and optionally containing a crosslinking agent, (2) an organic resin/colloidal silica binder mainly comprising a hydrophilic organic resin and colloidal silica and optionally containing a crosslinking agent, and (3) a water glass binder made of a mixture of alkali silicate and an anionic or nonionic aqueous organic resin as main components. Among these binders, the organic resin binder (1) and the organic resin/colloidal silica binder (2) are particularly preferred.

The hydrophilic organic resin in the organic resin binder (1) is, for example, a resin containing a hydroxyl, carboxyl or amino group or groups and capable of being solubilized or dispersed in water, in itself or as neutralized with an acid or base selected depending on the functional group or groups.

Specific examples of the hydrophilic organic resin include polyvinyl alcohols, modified polyvinyl alcohols (e.g., copolymers of a polyvinyl alcohol with acrylamide, unsaturated carboxylic acid, a sulfonic acid monomer, a cationic monomer, an unsaturated silane monomer or the like), polyacrylic acids, polyethylene glycols, carboxyl-containing acrylic resins, carboxyl-containing polyester resins, adducts of epoxy resins and amines, copolymer ionomers of ethylene and acrylic acid, and like synthesized hydrophilic resins; starch, cellulose, alginic acid and like natural polysaccharides; and oxidized starch, dextrin, esters of alginic acid and propylene glycol, carboxymethyl starch, carboxymethyl cellulose, hydroxymethyl starch, hydroxymethyl cellulose, hydroxyethyl cellulose and like derivatives of natural polysaccharides.

Examples of the optional crosslinking agent in the organic resin binder (1) include melamine resins such as methyl etherified melamine resins, butyl etherified melamine resins and methyl/butyl etherified melamine resin; urea resins such as methyl etherified urea resins; methyl etherified benzoguanamine resins; polyepoxy compounds such as di- or polyglycidyl ethers of polyphenols or aliphatic polyhydric alcohols, and amine-modified epoxy resins; blocked polyisocyanate compounds such as blocked products of triisocyanurated hexamethylene diisocyanate; and metal chelate compounds of metal elements such as titanium, zirconium and aluminum. The metal chelate compounds preferably have at least two metal alkoxide bonds per molecule. It is generally preferable that the crosslinking agent is soluble or dispersible in water.

The hydrophilic organic resin in the organic resin/colloidal silica binder (2) may be any of the hydrophilic organic resins listed above for use in the organic resin binder (1). The colloidal silica in the binder (2) is a silica sol or a particulate silica, and has a particle size of usually about 5 nm to 10 $\mu$m, preferably 5 nm to 1 $\mu$m. Usually, colloidal silica provided in the form of an aqueous dispersion can be used as it is, or alternatively, a particulate silica can be used as dispersed in water. The organic resin/colloidal silica binder (2) may be a mere mixture of the organic resin and colloidal silica, or a composite of the organic resin and colloidal silica formed by reaction in the presence of alkoxy silane. The crosslinking agent optionally used in the binder (2) may be any of the crosslinking agents listed above for use in the binder (1).

The aqueous organic resin in the water glass binder (3) may be any of the anionic or nonionic organic resins listed above as hydrophilic organic resins for use in the organic resin binder (1).

The hydrophilic film-forming binders are capable of being dissolved or dispersed in aqueous media. "Aqueous media" means water or mixtures of water as a main ingredient with an organic solvent.

The hydrophilizing composition may consist solely of an aqueous solution or dispersion of a hydrophilic film-forming binder, but may further contain the following ingredients as required: surfactants to improve the hydrophilicity of the coat; particulate hydrophilic polymers (having an average particle size of usually 0.03 to 1 $\mu$m, preferably 0.05 to 0.6 $\mu$m) to improve the hydrophilicity; 2-(4-thiazolyl) benzimidazole, bis(dimethylthiocarbamoyl)disulfide, zeolite(aluminosilicate) and like antibacterial agents; tannic acid, phytic acid, benzotriazole and like rust preventive agents; oxysalts of metals such as molybdenum, vanadium, zinc, nickel, cobalt, copper and iron; coloring pigments, extender pigments, rust preventive pigments and like pigments; etc.

The hydrophilizing composition is applied to the coat of the undercoating material formed on the surface of an aluminum or aluminum alloy fin (which may have been assembled into a heat exchanger) by a known process, such as dip coating, shower coating, spray coating, roll coating or electrocoating, and dried to obtain a hydrophilized fin for a heat exchanger. The conditions for drying the hydrophilizing composition can be selected according to the type of binder, thickness of the hydrophilizing coat and other factors. The composition is preferably dried for about 5 seconds to 30 minutes under such conditions that the substrate reaches a maximum temperature of about 80 to 250° C. The hydrophilizing coat may be cured during drying.

The thickness of the hydrophilizing coat formed from the hydrophilizing composition is not limited, but is preferably 0.3 to 5 $\mu$m, in particular 0.5 to 3 $\mu$m.

In this manner, a hydrophilized heat exchanger fin made of aluminum or aluminum alloy is obtained.

BEST MODE FOR CARRYING OUT THE INVENTION

The following Production Examples, Examples and Comparative Examples are provided to illustrate the invention in further detail, and are not to limit the scope of the claims of the invention. In the following examples, parts and percentages are all by weight.

Preparation of Titanium-Containing Aqueous Liquid (A)

PRODUCTION EXAMPLE 1

A mixture of 10 parts of tetraisopropoxy titanium and 10 parts of isopropanol was added dropwise to a mixture of 10 parts of 30% aqueous hydrogen peroxide and 100 parts of deionized water, at 20° C. with stirring over 1 hour. Thereafter, the resulting mixture was aged at 25° C. for 2 hours, giving a yellow, transparent, slightly viscous aqueous peroxo titanic acid solution (titanium-containing aqueous liquid (1)) having a solid content of 2%.

PRODUCTION EXAMPLE 2

The procedure of Production Example 1 was repeated except that 10 parts of tetra-n-butoxy titanium was used in place of tetraisopropoxy titanium, giving a titanium-containing aqueous liquid (2) having a solid content of 2%.

PRODUCTION EXAMPLE 3

The procedure of Production Example 1 was repeated except that 10 parts of a trimer of tetraisopropoxy titanium was used in place of tetraisopropoxy titanium, giving a titanium-containing aqueous liquid (3) having a solid content of 2%.

PRODUCTION EXAMPLE 4

The procedure of Production Example 1 was repeated except that a 3 times greater amount of aqueous hydrogen peroxide was used, the dropwise addition was carried out at 50° C. over 1 hour and the subsequent aging was carried out at 60° C. for 3 hours. In this manner, a titanium-containing aqueous liquid (4) having a solid content of 2% was obtained.

PRODUCTION EXAMPLE 5

Titanium-containing aqueous liquid (2) obtained in Production Example 2 was heated at 95° C. for 6 hours, giving a whitish yellow, translucent dispersion of titanium oxide (titanium-containing aqueous liquid (5)) having a solid content of 2%.

PRODUCTION EXAMPLE 6

10% aqueous ammonia was added dropwise to 500 cc of an aqueous solution obtained by diluting 5 cc of a 60% aqueous titanium tetrachloride solution with distilled water, to precipitate titanium hydroxide. The precipitates were washed with distilled water, mixed with 10 cc of a 30% aqueous hydrogen peroxide solution and stirred, giving 70 cc of a yellow, translucent, viscous liquid containing peroxo titanic acid (titanium-containing aqueous liquid (6)) having a solid content of 2%.

Examples of Coating Compositions for Forming a Titanium Oxide Film According to the Present Invention

EXAMPLE 1

A coating composition for forming a titanium oxide film was prepared by mixing 50 parts of titanium-containing aqueous liquid (1) obtained in Production Example 1, 5 parts of 20% zirconium hydrofluoric acid and 45 parts of deionized water.

EXAMPLES 2 TO 11 AND COMPARATIVE EXAMPLES 1 TO 3

Using the components shown in Table 1, coating compositions of the invention and comparative coating compositions were prepared in the same manner as in Example 1.

TABLE 1

| | | Example | | | | | | | | | | | Comp. Ex. | | |
|---|---|---|---|---|---|---|---|---|---|---|---|---|---|---|---|
| | | 1 | 2 | 3 | 4 | 5 | 6 | 7 | 8 | 9 | 10 | 11 | 1 | 2 | 3 |
| Titanium-containing aqueous liquid (A) | (1) | 50 | 50 | 50 | 50 | 50 | 50 | | | | | | 50 | | |
| | (2) | | | | | | | 50 | | | | | | 50 | |
| | (3) | | | | | | | | 50 | | | | | | 50 |
| | (4) | | | | | | | | | 50 | | | | | |
| | (5) | | | | | | | | | | 50 | | | | |
| | (6) | | | | | | | | | | | 50 | | | |
| Halide (B) | 20% zirconium hydrofluoric acid | 5 | | | | 2.5 | 10 | | | 5 | 10 | | | 0.3 | |
| | 10% zirconium ammonium fluoride | | 10 | | | | | 20 | | | | | | | |
| | 40% titanium hydrofluoric acid | | | 2.5 | | | | | 5 | | | 5 | | | 10 |
| | 10% titanium potassium fluoride | | | | 10 | | | | | | | | | | |
| Deionized water | | 45 | 40 | 47.5 | 40 | 47.5 | 40 | 30 | 45 | 45 | 40 | 45 | 50 | 49.7 | 40 |

Examples of undercoating of steel sheets using undercoating materials of the invention

EXAMPLES 12 TO 22 AND COMPARATIVE EXAMPLES 4 to 6

The coating compositions obtained in Examples 1 to 11 were used as steel sheet undercoating materials 1 to 11, respectively. The coating compositions obtained in Comparative Examples 1 to 3 were used as comparative steel sheet undercoating materials C1 to C3, respectively. Using these undercoating materials, steel sheet undercoating (1) was carried out.

(1) Steel Sheet Undercoating (1)

Electrogalvanized steel sheets (thickness: 0.6 mm, amount of plating on one side: 20 g/m$^2$) were degreased and washed. The undercoating materials were applied to the steel sheets to a dry thickness of 0.3 μm by spray coating, baked for 15 seconds under such conditions that a PMT (maximum temperature of the steel sheets) of 100° C. was reached, giving undercoated sheets.

"Cosmer 2050" (tradename, an acrylic/silica composite resin solution for use as a hydrophilizing agent, manufactured by Kansai Paint Co., Ltd.) was applied to the undercoated sheets to a dry thickness of 3 μm by spray coating, and baked for 20 seconds under such conditions that a PMT of 120° C. was reached, to thereby obtain test coated sheets.

(2) Performance Test of the Test Coated Sheets

The test coated sheets were tested for corrosion resistance and adhesion of the upper coat by the following methods.

Corrosion resistance: The end faces and back face of the test coated sheets were sealed. The resulting sheets were subjected to the salt spray test defined in JIS Z2371 for 240 hours. The degree of rusting on the coated surfaces was checked after 120 hours and 240 hours from the start of the test, and rated on the following scale.

a: No white rusting;

b: Less than 5% of the coated surface area had white rust;

c: Not less than 5% but less than 10% of the coated surface area had white rust;

d: Not less than 10% but less than 50% of the coated surface area had white rust;

e: 50% or more of the coated surface area had white rust.

Upper coat adhesion: "Amilac #1000 White" (tradename, a thermosetting alkyd resin coating composition (white) manufactured by Kansai Paint Co., Ltd.) was applied to the test coated sheets to a dry thickness of 30 μm, and baked at 130° C. for 20 minutes, giving topcoated sheets-1. Separately, "Magicron #1000 White" (tradename, a thermosetting acrylic resin coating composition (white) manufactured by Kansai Paint Co., Ltd.) was applied to the test coated sheets to a dry thickness of 30 μm and baked at 150° C. for 20 minutes to obtain topcoated sheets-2. On the surface of topcoated sheets-1 and topcoated sheets-2, 11 each of vertical and horizontal cuts reaching the substrate were made using a knife, to form 100 squares (1 mm×1 mm). Cellophane adhesive tape was stuck over the squares and rapidly peeled off. Then, the degree of peeling of the upper coat was rated on the following scale.

a: No peeling at all;

b: 1 or 2 squares peeled off;

c: 3 to 10 squares peeled off;

d: 10 or more squares peeled off.

Table 2 shows the test results.

TABLE 2

| Undercoating material No. | Corrosion resistance | | Upper coat adhesion | |
|---|---|---|---|---|
| | 120 hr | 240 hr | I | II |
| Ex. 12 | 1 | a | b | a | a |
| Ex. 13 | 2 | a | b | a | a |
| Ex. 14 | 3 | a | a | a | a |
| Ex. 15 | 4 | a | a | a | a |
| Ex. 16 | 5 | a | b | a | a |
| Ex. 17 | 6 | a | a | a | a |
| Ex. 18 | 7 | a | b | a | a |
| Ex. 19 | 8 | a | a | a | a |
| Ex. 20 | 9 | a | b | a | a |
| Ex. 21 | 10 | a | b | a | a |
| Ex. 22 | 11 | a | a | a | a |
| Comp. Ex. 4 | C1 | b | c | c | c |
| Comp. Ex. 5 | C2 | b | d | c | c |
| Comp. Ex. 6 | C3 | b | c | c | c |

In Table 2, I and II mean the upper coat adhesion test results of topcoated sheets-1 and topcoated sheets-2, respectively.

EXAMPLES 23 TO 33 AND COMPARATIVE EXAMPLES 7 TO 9

The coating compositions of Examples 1 to 11 were used as steel sheet undercoating materials 1 to 11, respectively. The coating compositions of Comparative Examples 1 to 3 were used as comparative steel sheet undercoating materials C1 to C3, respectively. Using these undercoating materials, steel sheet undercoating (2) was carried out.

(1) Steel Sheet Undercoating (2)

Hot-dip galvanized steel sheets (thickness: 0.4 mm, amount of plating on one side: 120 g/m$^2$) were degreased and washed. The undercoating materials were applied to the steel sheets to a dry thickness of 0.3 μm by spray coating, and baked for 10 seconds under such conditions that a PMT of 100° C. was reached, giving undercoated sheets.

"KP Color 8000 Primer" (tradename, an epoxy resin coating composition manufactured by Kansai Paint Co., Ltd.) was applied to the undercoated sheets to a dry thickness of 5 μm by spray coating, and baked for 20 seconds under such conditions that a PMT of 210° C. was reached, to form primer coats.

"KP Color 1580 White" (tradename, a polyester resin topcoat composition (white) manufactured by Kansai Paint Co., Ltd.) was applied to the primer coats to a dry thickness of 15 μm by spray coating, and baked for 40 seconds under such conditions that a PMT of 215° C. was reached, to obtain test coated sheets having an upper coat.

(2) Performance Test of the Test Coated Sheets

The test coated sheets were tested for upper coat adhesion, corrosion resistance and moisture resistance.

The upper coat adhesion was tested in the same manner as the method for testing the upper coat adhesion of topcoated sheets-2 described above.

The corrosion resistance and moisture resistance were tested by the following methods.

Corrosion resistance: The test coated sheets having an upper coat were cut into a dimension of 70 mm×150 mm. The end faces and back face of the resulting test coated sheets were sealed. Then, the test coated sheets were placed in an upright position, and a 4T bending portion was made in the upper part of each test coated sheet, by bending the sheet so that the coated side faced outside, at an angle of 180° C. around 4 spacers having a thickness of 4 mm. Further, a crosscut portion was made in the lower part of each test coated sheet. The resulting sheets were subjected to the salt spray test defined in JIS Z2371 for 1,000 hours, and checked for the degree of blistering in the unprocessed portion (the central portion without bending or crosscut), the width of blister in the crosscut portion, and the degree of white rusting in the 4T bending portion. The results were rated on the following scale.

[Degree of Blistering in the Unprocessed Portion]
- a: No blistering;
- b: Slight blistering;
- c: Marked blistering;
- d: Serious blistering.

[Width of Blister in the Crosscut Portion (the Width of Blister on One Side of the Crosscut, as Measured from the Crosscut)]
- a: Less than 1 mm;
- b: Not less than 1 mm but less than 2 mm;
- c: Not less than 2 mm but less than 5 mm;
- d: 5 mm or more.

[Degree of White Rusting in the 4T Bending Portion]
- a: No white rusting;
- b: Slight white rusting;
- c: Marked white rusting;
- d: Serious white rusting.

Moisture resistance: The end faces and back face of the test coated sheets having an upper coat were sealed. The resulting sheets were tested for moisture resistance according to JIS K5400 9.2.2. The test was carried out for 1,000 hours in a moisture resistance tester box at a temperature of 49° C. and a relative humidity of 95 to 100%. The degree of blistering of coats on the sheets after the test was rated on the following scale.
- a: No blistering;
- b: Slight blistering;
- c: Marked blistering;
- d: Serious blistering.

Table 3 shows the test results.

TABLE 3

| | Under-coating material No. | Upper coat adhesion | Corrosion resistance | | | |
|---|---|---|---|---|---|---|
| | | | Un-processed portion | Cross-cut portion | 4T bending portion | Moisture resistance |
| Ex. 23 | 1 | a | a | b | b | a |
| Ex. 24 | 2 | a | a | b | b | a |
| Ex. 25 | 3 | a | a | a | a | a |
| Ex. 26 | 4 | a | a | a | b | a |
| Ex. 27 | 5 | a | a | b | b | a |
| Ex. 28 | 6 | a | a | a | b | a |
| Ex. 29 | 7 | a | a | b | b | a |
| Ex. 30 | 8 | a | a | b | b | a |
| Ex. 31 | 9 | a | a | b | b | a |
| Ex. 32 | 10 | a | a | b | b | a |
| Ex. 33 | 11 | a | a | a | a | a |
| Comp. Ex. 7 | C1 | c | a | c | c | b |
| Comp. Ex. 8 | C2 | c | a | c | c | b |
| Comp. Ex. 9 | C3 | c | a | c | c | b |

Examples of Post-Treatment of Undercoated Steel Sheets With Post-Treating Agents of the Invention

EXAMPLES 34 TO 44 AND COMPARATIVE EXAMPLES 10 TO 12

The coating compositions obtained in Examples 1 to 11 were used as post-treating agents 1 to 11, respectively. The coating compositions obtained in Comparative Examples 1 to 3 were used as comparative post-treating agents C1 to C3, respectively. Using these post-treating agents, zinc phosphate undercoated steel sheets were post-treated as follows.

(1) Undercoating of Plated Steel Sheets

Zinc phosphate undercoating was carried out using, as substrates, plated steel sheets each comprising a 0.8 mm thick cold rolled steel sheet and a zinc plating or a zinc alloy plating formed on the steel sheet.

The plated steel sheets used were of the following six types:

(i) Electrogalvanized steel sheet having 20 g/m$^2$ of zinc plating, hereinafter referred to as "EG";

(ii) Hot-dip galvanized steel sheet having 60 g/m$^2$ of zinc plating, hereinafter referred to as "HDG";

(iii) Alloyed hot-dip galvanized steel sheet having 60 g/m$^2$ of zinc alloy plating containing 10% Fe, hereinafter referred to as "Zn—Fe";

(iv) Zinc-nickel alloy plated steel sheet having 30 g/m$^2$ of zinc alloy plating containing 12% Ni, hereinafter referred to as "Zn—Ni";

(v) Zinc-aluminum alloy plated steel sheet having 150 g/m$^2$ of zinc alloy plating containing 12% Al, hereinafter referred to as "Zn-12% Al";

(vi) Zinc-aluminum alloy plated steel sheet having 250 g/m$^2$ of zinc alloy plating containing 55% Al, hereinafter referred to as "Zn-55% Al".

The surfaces of the plated steel sheets were alkali degreased, and conditioned by spray coating with "Preparen Z" (tradename of Nihon Parkerizing Co., Ltd.). Thereafter, the steel sheets were spray-coated with "Palbond 3308" (tradename of an aqueous zinc phosphate solution manufactured by Nihon Parkerizing Co., Ltd.), washed with water and dried, to obtain plated steel sheets each having 1.5 g/m$^2$ of zinc phosphate undercoat.

(2) Post-Treatment

The above post-treating agents were applied to the plated steel sheets having a zinc phosphate undercoat, to a dry thickness of 0.2 g/m$^2$ by spray coating, and baked for 5 seconds so that the substrate reached 100° C., to obtain test sheets.

(3) Performance Test of the Test Sheets

The test sheets were tested for appearance of the coated surface, coating adhesion and corrosion resistance by the following methods.

Appearance of the coated surface: The uniformity of the post-treatment coats on the test sheets were checked with the naked eye, and evaluated on the following scale.
- a: Uniform;
- b: Slightly uneven;
- c: Markedly uneven.

Coating adhesion: "Magicron #1000 White" (tradename of a thermosetting acrylic resin coating composition (white) manufactured by Kansai Paint Co., Ltd.) was applied to the test sheets to a dry thickness of 30 $\mu$m, baked at 160° C. for 20 minutes, giving coated sheets. The coated sheets were immersed in a boiling water at about 98° C for 2 hours, pulled out and allowed to stand at room temperature for 24 hours. Thereafter, on the surface of the coated sheets, 11 each of vertical and horizontal cuts reaching the substrate were made with a knife to form 100 squares (1 mm×1 mm). Cellophane adhesive tape was stuck over the squares and rapidly peeled off. Then, the percentage of peeled area relative to the total area of the 100 squares was found to evaluate the degree of peeling of the upper coat. The evaluation was carried out on the following scale.

a: No peeling at all;
b: Some peeling occurred, but the peeled area accounted for less than 10% of the total area;
c: Not less than 10% but less than 25% of the total area peeled;
d: Not less than 25% but less than 50% of the total area peeled,
e: More than 50% of the total area peeled.

Corrosion resistance: The test sheets were cut into a dimension of 70 mm×150 mm. The end faces and back face of the resulting test sheets were sealed. The test sheets were then subjected to the salt spray test defined in JIS Z2371, to evaluate the degree of white rusting on the coated surfaces after 24 hours, 48 hours and 72 hours from the start of the test. The evaluation was carried out on the following scale.

a: No white rusting;
b: Less than 10% of the coated surface area had white rust;
c: Not less than 10% but less than 25% of the coated surface area had white rust;
d: Not less than 25% but less than 50% of the coated surface area had white rust;
e: More than 50% of the coated surface area had white rust.

Table 4 shows the test results.

TABLE 4

| Post-treating agent No. | Plated steel sheet | Appearance of the coated surface | Coating adhesion | Corrosion resistance 24 hr | 48 hr | 72 hr |
|---|---|---|---|---|---|---|
| Ex. 34 | 1 | EG | a | a | a | b | c |
| Ex. 35 | 2 | EG | a | a | a | b | c |
| Ex. 36 | 3 | EG | a | a | a | a | b |
| Ex. 37 | 4 | HDG | a | a | a | a | a |
| Ex. 38 | 5 | HDG | a | a | a | a | a |
| Ex. 39 | 6 | Zn-Fe | a | a | a | a | b |
| Ex. 40 | 7 | Zn-Fe | a | a | a | a | b |
| Ex. 41 | 8 | Zn-Ni | a | a | a | a | b |
| Ex. 42 | 9 | Zn-12% Al | a | a | a | a | a |
| Ex. 43 | 10 | Zn-55% Al | a | a | a | a | a |
| Ex. 44 | 11 | Zn-55% Al | a | a | a | a | a |
| Comp. Ex. 10 | C1 | EG | a | b | b | c | d |
| Comp. Ex. 11 | C2 | HDG | a | b | a | b | c |
| Comp. Ex. 12 | C3 | Zn-Fe | a | b | b | c | d |

Examples of Undercoating of Aluminum Sheets With Undercoating Materials Invention

EXAMPLES 45 TO 55 AND COMPARATIVE EXAMPLES 13 TO 15

The coating compositions of Examples 1 to 11 were used as aluminum sheet undercoating materials 1 to 11, respectively. The coating compositions of Comparative Examples 1 to 3 were used as comparative aluminum sheet undercoating materials C1 to C3, respectively. Using these materials, aluminum sheets were undercoated.

(1) Undercoating of Aluminum Sheets 0.1 mm thick aluminum sheets (Ai1050) were degreased with a 2% aqueous solution of an alkaline degreasing agent (tradename "Chemicleaner 561B", manufactured by Japan CB Chemical Co.) and washed with water. The undercoating materials were applied to the aluminum sheets to a dry thickness of 2 µm, and baked for seconds under such conditions that a PMT of 100° C. was reached, to form undercoats.

Subsequently, "Cosmer 1310" (tradename, a hydrophilizing composition mainly comprising a hydrophilic organic resin and colloidal silica, manufactured by Kansai Paint Co., Ltd.) was applied to the undercoats to a dry thickness of 1 µm, and baked for 10 seconds under such conditions that a PMT of 230° C. was reached, giving test coated sheets.

(2) Performance Test of the Test Coated Sheets

The test coated sheets were tested for appearance of the coated surface, rubbing resistance, hydrophilicity and corrosion resistance.

Appearance of the coated surface: The test coated sheets were checked with the naked eye. Test sheets without abnormalities such as cracking, peeling or pinholes were rated "a", whereas those having any of these abnormalities were rated as "b".

Dry rubbing resistance: The coated surfaces were rubbed back and forth with "Kimwipe" (tradename, paper manufactured by Jujo Kimberley Co., Ltd.) over a distance of about 5 cm with a pressure of about 4 kg/cm$^2$. The number of times of the back-and-forth rubbing until the coats were rubbed off and the aluminum sheet surfaces were exposed, was counted and rated on the following scale.

a: The aluminum sheet surface was not exposed by 10 times of rubbing;
b: The aluminum sheet surface was exposed by 5 to 10 times of rubbing;
c: The aluminum sheet surface was exposed by less than 5 times of rubbing.

Water rubbing resistance: The coated surfaces were rubbed back and forth with gauze soaked with deionized water, over a distance of about 5 cm with a pressure of about 4 kg/cm$^2$. The number of times of the back-and-forth rubbing until the coats were rubbed off and the aluminum sheet surfaces were exposed, was counted and rated on the following scale.

a: The aluminum sheet surface was not exposed by 10 times of rubbing;
b: The aluminum sheet surface was exposed by 5 to 10 times of rubbing;
c: The aluminum sheet surface was exposed by less than 5 times of rubbing.

Hydrophilicity: The test coated sheets were immersed in running tap water (in an amount of 15 kg/hr per 1 m$^2$ of coated area) for 7 hours, pulled out and dried 17 hours at 20° C. This dry-wet cycle was repeated 5 times. Then, the resulting test sheets were checked for water wettability and water contact angle (hydrophilicity after accelerated testing). Further, the test coated sheets not subjected to the dry-wet cycle test were checked for water wettability and water contact angle (initial hydrophilicity).

The water wettability and water contact angle were determined in the following manner.

Water wettability: The test coated sheets were immersed in tap water in a beaker for 10 seconds and pulled out. The degree of wetting of the coated surfaces were checked with the naked eye, and rated on the following scale.

a: The whole surface was wet, and even 10 seconds after pulling out, the surface was evenly covered with water;

b: The whole surface was wet immediately after pulling out, but after 10 seconds, water on the test coated sheet had gathered in the central part of the sheet;

c: The surface was only partially wet because water drops were formed immediately after pulling out.

Water contact angle: The test coated sheets were dried at 80° C. for 5 minutes. 0.03 cc of deionized water was dropped on the surface of each test coated sheet using an injection syringe to form a water drop. The contact angle of the water drop was measured using "Contact Angle Meter DCAA" manufactured by Kyowa Chemical Industry Co., Ltd.

Corrosion resistance: The test coated sheets were subjected to the salt spray test defined in JIS Z2371. The coated surface condition was checked after 120 hours, 240 hours and 360 hours from the start of the test, and evaluated on the following scale.

a: No white rusting or blistering on the coated surface;

b: Slight white rusting or blistering;

c: Serious white rusting or blistering.

Table 5 shows the test results.

TABLE 5

|  | Under-coating material No. | Appearance of coated surface | Rubbing resistance Dry | Rubbing resistance Water | Initial hydrophilicity Wettability | Initial hydrophilicity Angle | Hydrophilicity after accelerated testing Wettability | Hydrophilicity after accelerated testing Angle | Corrosion resistance 120 hr | Corrosion resistance 240 hr | Corrosion resistance 360 hr |
|---|---|---|---|---|---|---|---|---|---|---|---|
| Ex. 45 | 1 | a | a | a | a | <5° | a | 19° | a | a | a |
| Ex. 46 | 2 | a | a | a | a | <5° | a | 27° | a | a | b |
| Ex. 47 | 3 | a | a | a | a | <5° | a | 30° | a | a | a |
| Ex. 48 | 4 | a | a | a | a | <5° | a | 28° | a | a | a |
| Ex. 49 | 5 | a | a | a | a | <5° | a | 20° | a | a | b |
| Ex. 50 | 6 | a | a | a | a | <5° | a | 22° | a | a | a |
| Ex. 51 | 7 | a | a | a | a | <5° | a | 25° | a | a | a |
| Ex. 52 | 8 | a | a | a | a | <5° | a | 30° | a | a | a |
| Ex. 53 | 9 | a | a | a | a | <5° | a | 19° | a | a | a |
| Ex. 54 | 10 | a | a | a | a | <5° | a | 22° | a | a | a |
| Ex. 55 | 11 | a | a | a | a | <5° | a | 30° | a | a | a |
| Comp. Ex. 13 | C1 | b | a | c | a | <5° | a | 38° | b | b | c |
| Comp. Ex. 14 | C2 | b | a | b | a | <5° | a | 42° | b | b | c |
| Comp. Ex. 15 | C3 | a | a | a | a | <5° | b | 60° | a | a | a |

In Table 5, "wettability" and "angle" mean water wettability and water contact angle, respectively.

The coating composition for forming a titanium oxide film, process for forming a titanium oxide film, undercoating material and post-treatment agent of the present invention have the following remarkable advantages.

(1) The coating composition of the invention has excellent storage stability. This is presumably because the titanium-containing aqueous liquid (A) is stable by itself and forms a stable complex with the halide (B).

(2) The process using the coating composition of the invention is capable of forming, on a metal substrate, a titanium oxide-containing film excellent in corrosion resistance, processability, coating adhesion, hydrophilicity and like properties. The excellent corrosion resistance and hydrophilicity are achieved presumably because: the film has good adhesion to the substrate; the film is a dense titanium oxide film which has low permeability to oxygen or water vapor; and, during heat-drying, the halide (B) transfers to the film surface and converts into hydroxide, thereby improving the corrosion resistance and hydrophilicity.

(3) Owing to the above advantage (2), the coating composition of the invention is extremely suitable as an undercoating material for metal substrates and as a post-treating agent for phosphate undercoats on metal substrates.

(4) A metal substrate coated with the coating composition of the invention as an undercoating material or a post-treating agent can be advantageously used as a rust resistant metal substrate, without further treatment.

(5) When an aluminum or aluminum fin for a heat exchanger is coated with the coating composition of the invention to form an undercoat and further coated with a hydrophilizing coat, the resulting fin is free from water bridges of condensed water generated during cooling operation, and thus is prevented from corrosion.

What is claimed is:

1. A coating composition for forming a titanium oxide film, comprising (A) a titanium-containing aqueous liquid obtained by mixing at least one titanium compound selected from the group consisting of hydrolyzable titanium compounds, low condensates of hydrolyzable titanium compounds, titanium hydroxide and low condensates of titanium hydroxide with aqueous hydrogen peroxide, and (B) at least one halide selected from the group consisting of titanium halides, titanium halide salts, zirconium halides, zirconium halide salts, silicon halides and silicon halide salts.

2. A coating composition according to claim 1, wherein the titanium-containing aqueous liquid (A) is an aqueous peroxo titanic acid solution obtained by mixing a hydrolyzable titanium compound and/or its low condensate with aqueous hydrogen peroxide.

3. A coating composition according to claim 2, wherein the hydrolyzable titanium compound is a tetraalkoxytitanium represented by the formula $$Ti(OR)_4 \qquad (1)$$

wherein Rs may be the same or different and each represent $C_1$ to $C_5$ alkyl.

4. A coating composition according to claim 2, wherein the low condensate of a hydrolyzable titanium compound is a compound having a condensation degree of 2 to 30 and obtained by self-condensation of tetraalkoxytitanium(s) represented by the formula $$Ti(OR)_4 \quad (1)$$

wherein Rs may be the same or different and each represent $C_1$ to $C_5$ alkyl.

5. A coating composition according to claim 2, wherein the proportion of the aqueous hydrogen peroxide is 0.1 to 100 parts by weight calculated as hydrogen peroxide, per 10 parts by weight of the hydrolyzable titanium compound and/or its low condensate.

6. A coating composition according to claim 2, wherein the titanium-containing aqueous liquid (A) is an aqueous peroxo titanic acid solution obtained by mixing a hydrolyzable titanium compound and/or its low condensate with aqueous hydrogen peroxide in the presence of a titanium oxide sol.

7. A coating composition according to claim 6, wherein the titanium oxide sol is an aqueous dispersion of anatase titanium oxide.

8. A coating composition according to claim 6, wherein the proportion of the titanium oxide sol is 0.01 to 10 parts by weight as solids, per 1 part by weight of the hydrolyzable titanium compound and/or its low condensate.

9. A coating composition according to claim 1, wherein the halide (B) is at least one member selected from the group consisting of titanium hydrofluoric acid, titanium potassium fluoride, titanium ammonium fluoride, zirconium hydrofluoric acid, zirconium ammonium fluoride, zirconium potassium fluoride, hydrosilicofluoric acid, sodium silicofluoride, ammonium silicofluoride and potassium silicofluoride.

10. A coating composition according to claim 1, wherein the proportion of the halide (B) is 10 to 300 parts by weight per 100 parts by weight of the solids in the titanium-containing aqueous liquid (A).

11. A coating composition according to claim 1, which has a pH of 2 to 10.

12. A process for forming a titanium oxide film, comprising applying a coating composition according to claim 1 to a metal substrate and drying the resulting coat.

13. An undercoating material for a metal substrate, which is a coating composition according to claim 1.

14. An undercoating material according to claim 13, wherein the metal substrate is a steel sheet.

15. A coated steel sheet comprising a film of an undercoating material according to claim 14 formed on a steel sheet surface.

16. A coated steel sheet according to claim 15, wherein the film is 0.05 to 10 $\mu$m thick.

17. An undercoating material according to claim 13, wherein the metal substrate is made of aluminum or aluminum alloy.

18. A coated substrate comprising a film of an undercoating material according to claim 17 formed on a surface of an aluminum substrate or an aluminum alloy substrate.

19. A coated substrate according to claim 18, wherein the film is 0.001 to 10 $\mu$m thick.

20. A heat exchanger fin comprising an aluminum substrate or an aluminum alloy substrate, a film of an undercoating material according to claim 17 formed on the substrate, and a hydrophilizing coat formed on the film.

21. A fin according to claim 20, wherein the film of the undercoating material is 0.001 to 10 $\mu$m thick, and the hydrophilizing coat is 0.3 to 5 $\mu$m thick.

22. A post-treating agent for phosphate undercoats on metal substrates, which is a coating composition according to claim 1.

23. A post-treating agent according to claim 22, wherein the metal substrate is a steel sheet.

24. A coated substrate comprising a film of a post-treating agent according to claim 22 formed on a surface of a phosphate undercoat on a metal substrate.

25. A coated substrate according to claim 24, wherein the weight of the film of the post-treating agent is 0.05 to 3.0 g/m².

* * * * *